United States Patent
Cook et al.

(10) Patent No.: US 8,459,621 B2
(45) Date of Patent: Jun. 11, 2013

(54) BONDED MICRO CELLULAR URETHANE SUSPENSION COMPONENT

(75) Inventors: Josh Cook, Grand Junction, MI (US); Wade J. Singler, St. Joseph, MI (US); Troy Molesworth, South Haven, MI (US)

(73) Assignee: Trelleborg Automotive USA, Inc., South Haven, MI (US)

( * ) Notice: Subject to any disclaimer, the term of this patent is extended or adjusted under 35 U.S.C. 154(b) by 232 days.

(21) Appl. No.: 12/962,734

(22) Filed: Dec. 8, 2010

(65) Prior Publication Data
US 2011/0135867 A1 Jun. 9, 2011

Related U.S. Application Data

(60) Provisional application No. 61/267,515, filed on Dec. 8, 2009.

(51) Int. Cl.
*B60G 13/00* (2006.01)
(52) U.S. Cl.
USPC ............ 267/220; 267/179; 280/124.155
(58) Field of Classification Search
USPC .......... 267/2, 33, 179, 220; 188/321.11; 280/124.147, 124.155, 124.151, 124.141, 280/124.142, 124.13
See application file for complete search history.

(56) References Cited

U.S. PATENT DOCUMENTS

| | | | | |
|---|---|---|---|---|
| 5,308,048 A | * | 5/1994 | Weaver et al. | 267/220 |
| 5,788,262 A | * | 8/1998 | Dazy et al. | 280/124.155 |
| 6,155,544 A | * | 12/2000 | Solomond et al. | 267/220 |
| 6,439,550 B1 | | 8/2002 | Koch | |
| 6,733,023 B2 | * | 5/2004 | Remmert et al. | 280/124.179 |
| 7,070,157 B2 | | 7/2006 | Huprikar et al. | |
| 7,416,175 B2 | * | 8/2008 | Al-Dahhan | 267/220 |
| 2003/0222386 A1 | * | 12/2003 | Duerre et al. | 267/166 |
| 2006/0082038 A1 | | 4/2006 | Al-Dahhan et al. | |
| 2007/0244270 A1 | * | 10/2007 | December et al. | 525/528 |

FOREIGN PATENT DOCUMENTS

| | | | |
|---|---|---|---|
| JP | 10184752 A | * | 7/1998 |
| JP | 11117982 A | * | 4/1999 |
| JP | 2004150596 A | | 5/2004 |

* cited by examiner

*Primary Examiner* — Robert A Siconolfi
*Assistant Examiner* — Mariano Sy
(74) *Attorney, Agent, or Firm* — Gifford, Krass, Sprinkle, Anderson & Citkowski, P.C.

(57) ABSTRACT

The present invention provides a method of bonding suspension components which creates strong and durable bonding layer by using a chemical coating compatible with MCU. The bonding material uses coating materials to form an intermediated property bonding layer. This bonding layer prevents corrosion on the metal suspension components. The coating has the correct chemical activity to chemically bond MCU at the molecular level during the standard curing reaction. The coating provides an intermediated property layer to improve cyclic fatigue bonding performance, and bond effectively during molding and manufacturing operations.

38 Claims, 2 Drawing Sheets

BONDED MICRO CELLULAR URETHANE SUSPENSION COMPONENT

CROSS-REFERENCE TO RELATED APPLICATIONS

This application claims priority of U.S. Provisional Patent Application Ser. No. 61/267,515 filed Dec. 8, 2009, which is incorporated herein by reference

FIELD OF THE INVENTION

This invention relates generally to suspension components. More specifically, this invention relates to a bonded micro cellular urethane suspension component utilizing a chemical bonding procedure.

BACKGROUND OF THE INVENTION

Elastomeric suspension components that use Micro Cellular Urethane (hereinafter 'MCU') as the elastomeric are generally not chemically bonded to other components in the system. Traditionally, mechanical interlocks or physical adhesion methods are used to bond suspension components that use MCU. Mechanical interlocks and physical adhesion are frequently not strong enough to endure high numbers of cycles and repeated suspension component use. Accordingly, it is desirable to utilize chemical bonding agents to better strengthen or supplement a mechanical interlock or physical adhesion. Some chemical bonding agents are available to bond MCU suspension components. An example of a commonly used chemical bonding agent is Silane. Silane bonding agents, $SiH_4$ (silicon analogue of methane), are used to adhere the components together. Silane bonding agents creates a bonding layer that is thin and not durable. Furthermore, silane provides very little corrosion protection to the parts which it bonds together. For example, silane provides little to no corrosion protection if the suspension components are steel. Accordingly, it remains desirable to provide a method of chemical bonding suspension components which creates strong and durable bonding layer.

SUMMARY OF THE INVENTION

The present invention provides a method of bonding suspension components which creates strong and durable bonding layer by using a chemical coating compatible with MCU. The bonding material uses coating materials to form an intermediated property bonding layer. This bonding layer also prevents corrosion on the metal suspension components. The coating has the correct chemical activity to chemically bond MCU at the molecular level during the standard curing reaction. The coating provides an intermediated property layer to improve cyclic fatigue bonding performance, and bond effectively during molding and manufacturing operations.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION

Figure 1:
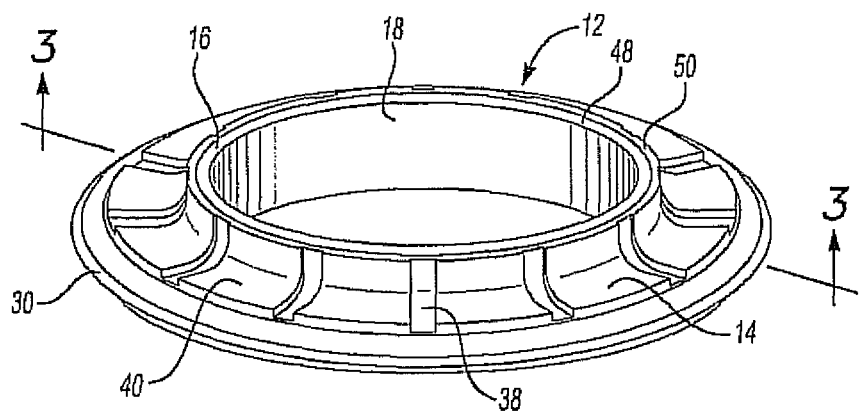
FIG. 1 is a perspective view of the MCU suspension component and the metal component.
Figure 2:
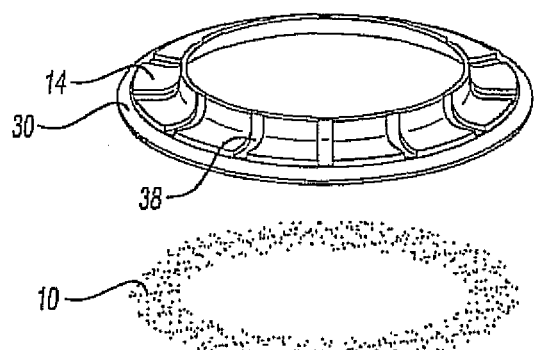
FIG. 2 is an exploded perspective view of the MCU and the metal component.
Figure 2:
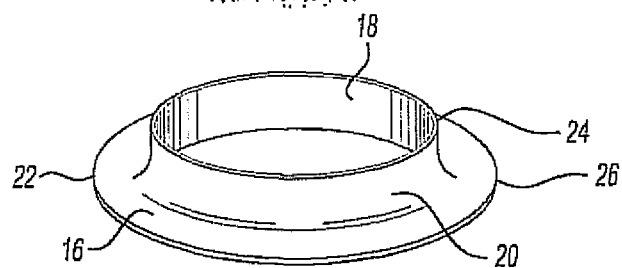
Figure 3:
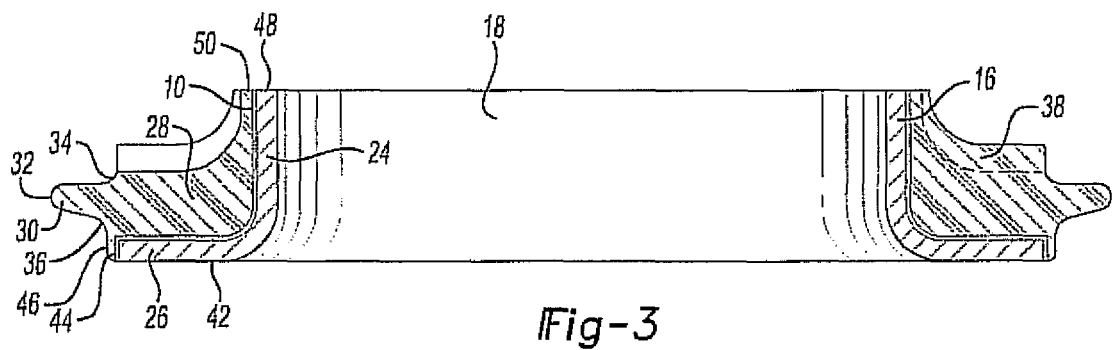
FIG. 3 is a cross sectional view along line 3-3 of FIG. 1 of the MCU suspension component and the metal component including the intermediate adhesive coating between the MCU suspension component and the metal component.

The present disclosure provides a method of bonding suspension components which creates strong and durable bonding layer by using a chemical coating 10 compatible with MCU to create the main suspension component 12. The main suspension component 12 includes a MCU suspension component 14 and a metal suspension component 16. The bonding material uses coating materials to form an intermediated property bonding layer. This bonding layer prevents corrosion on the metal suspension components. The coating 10 has the correct chemical activity to chemically bond MCU at the molecular level during the standard curing reaction. The coating 10 provides an intermediated property layer to improve cyclic fatigue bonding performance, and bond effectively during molding and manufacturing operations.

The present embodiment elementally discloses a MCU suspension component 14 bonded to a metal suspension component 16. Alternatively, the metal suspension component 16 is bonded to a bump stop, strut mount or bushing. In this embodiment, the MCU suspension component will alter in shape and size as compared to the first disclosed embodiment as shown in the drawings.

The coating 10 is applied as a coating to the metal suspension component insert or substrate that the MCU material is bonded to. The coating 10 has the correct chemical activity to chemically bond MCU at the molecular level during the standard curing reaction. The coating 10 provides an intermediated property layer to improve cyclic fatigue bonding performance, and bond effectively during molding and manufacturing operations. The coating 10 is applied as a coating to the metal suspension component insert or substrate that the MCU material is bonded to. The coating 10 has active molecular sites that are available for the MCU to bond during the polymerization reaction. NCO groups in the MCU have an affinity for the active molecules on the surface of the coating and cross-link to form a durable bonded layer.

The coating 10 is better defined as a urethane electrocoating. The urethane electrocoating is applied to the metal suspension component 16 and processed to maintain reactivity of the surface of the metal. The isocyanate group of the elastomer system uses the free hydrogen from the coating urethane group to form a covalent allophonate bond. The reaction of urethane material is a two component liquid that is reacted in the mold, or die, to form the urethane material. A blowing agent is added to the reaction to create the foam-like (low density) nature of the material. See formula as depicted in formula (I) below.

Urethane

-continued

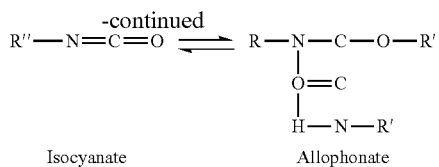

Isocyanate    Allophonate

This chemical composition is provided only by way of example as other chemical compositions and coatings 10 are available to facilitate bonding of the MCU suspension component 14 to the metal suspension component 16.

Metal suspension component 16 is bonded to a MCU suspension component 14. Metal suspension component 16 includes an inner surface 18 and an upper surface 20. The metal suspension component 16 further includes an outer peripheral edge 22. The upper surface 20 of the metal suspension component 16 is generally planar and smooth. Alternatively, the upper surface 20 of the metal suspension component 16 is textured to facilitate bonding of the coating 10 and the MCU suspension component 14.

The metal suspension component 16 is further defined by an upper peripheral sleeve 24 and a lower ledge 26 wherein the upper peripheral sleeve 24 and the lower ledge 26 meet to form a generally curved or rounded right angle 28. The upper surface 20 of the metal suspension component 16 is curved upwards allowing the first surface to move from a generally horizontal to a generally vertical position normal to the inner surface 18 thereby forming the curved right angle 28. The inner surface 18 is smooth. The inner surface 18 does not have any MCU or coating 10 applied or bonded to it. The coating 10 is applied as a coating to the upper surface 20 of the metal suspension component 16.

Although metal suspension component 16 is depicted in a circular or ring configuration, this depiction should not serve to limit the structure of a metal suspension component. Other designs and structures of a metal suspension component 16 and the MCU suspension component 14 are available and this disclosure should not serve to limit other various designs, structures or configurations of metal suspension component 16 and the MCU suspension component 14.

The MCU suspension component 14 is a circular or ring configuration allowing the MCU suspension component 14 to fit securely on the upper surface 20 of the MCU suspension component 14. The MCU suspension component 14 is molded onto the metal suspension component 16.

The MCU suspension component 14 is generally circular including a peripheral protrusion 30 having a rounded edge 32. The peripheral protrusion 30 forms a one piece construction with the MCU suspension component 14 including a first rounded attachment point 34 and a second rounded attachment point 36. The MCU suspension component 14 further includes a plurality of indentations 38. The indentations 38 are positioned on an upper surface 40 of the MCU suspension component 14. The indentations 38 have a generally rectangular cross section and are elongated. Alternatively, a plurality of protrusions are provided on the upper surface 40 of the MCU suspension component 14. The indentations 38 assist in mechanically securing the main suspension component 12 to other suspension components as needed.

The metal suspension component 16 further includes a lower surface 42 having a lower peripheral edge 44. The MCU suspension component 14 extends over the lower peripheral edge 44, as shown by reference numeral 46. Furthermore, the metal suspension component 16 includes an upper peripheral edge 48 adjacent the inner surface 18. The MCU material 50 of the MCU suspension component 14 does not extend over the upper peripheral edge 48.

Figure 4:
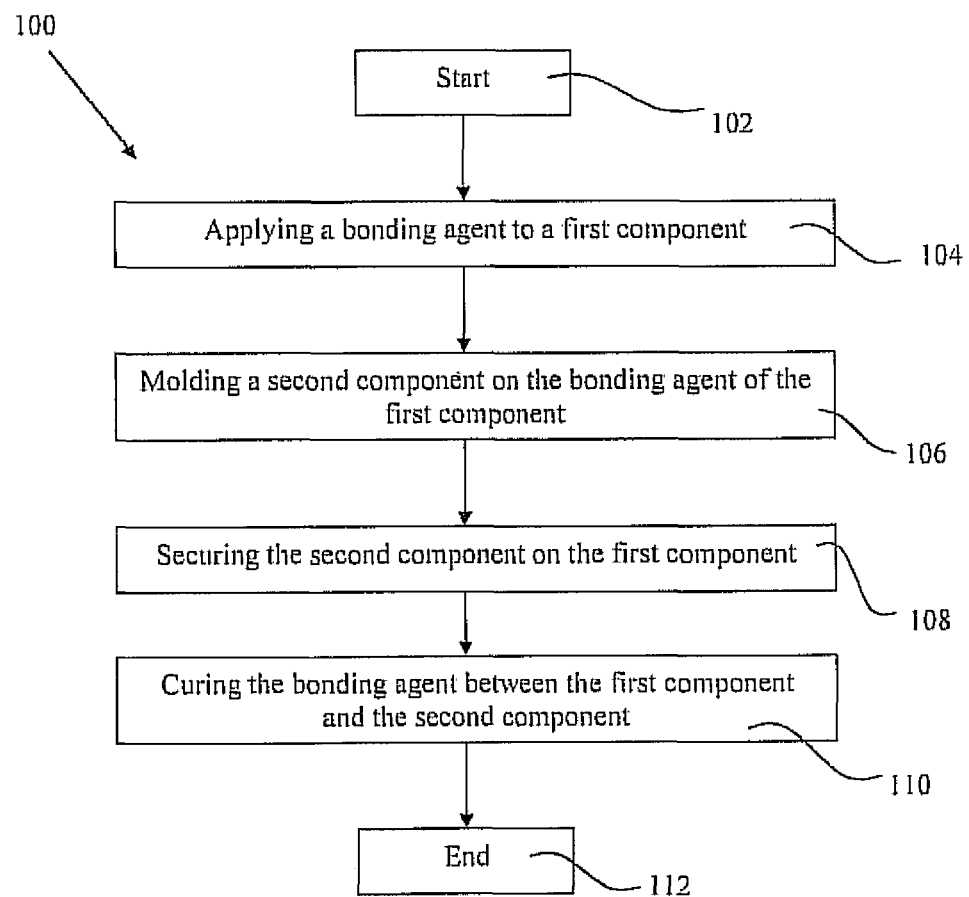
FIG. 4 is a drawing showing a flow chart describing the method of bonding a plurality of suspension components.

A method 100 for bonding and molding the MCU suspension component 14 to the metal suspension component 16 is also provided, as shown in FIG. 4. The method 100 includes the steps of applying 104 a bonding agent or coating 10 to the metal suspension component 16, molding 106 the MCU suspension component 14 on the coating 10 of the metal suspension component, securing 108 the MCU suspension component 14 on the metal suspension component 16 and curing 110 the coating 10 between the MCU suspension component 14 and the metal suspension component 16. The chemical reaction as provided in formula (I) references previously occurs during the molding 106 process. The securing 108 step can be as simple as positioning and aligning the MCU suspension component 14 on the metal suspension component 16. The method 100 may include the use of a mold structure (no shown) to facilitate the molding 106 of the MCU suspension component 14 on the metal suspension component 16.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A multi piece vehicle suspension component, the suspension component comprising:
a first rigid component;
a second resilient component, the second resilient component being formed of a microcellular urethane, the microcellular urethane having NCO groups, the first rigid component having complementary structure with respect to the second resilient component, the first rigid component connected to and overlaying a portion of the second resilient component; and
a layer of bonding agent disposed on the first rigid component to prevent corrosion of the first rigid component, the bonding agent being an urethane electrocoating, the second resilient component molded on the bonding agent of the first rigid component, the NCO groups in the microcellular urethane having an affinity for the active molecules in the bonding agent and cross-linking to form a durable bonded layer thereby improving bonding between the first rigid component and the second resilient component and further improving cyclic fatigue of the multi piece vehicle suspension component.

2. The multi piece vehicle suspension component of claim 1, wherein the first rigid component and second resilient component are generally circular, each including a first aperture.

3. The multi piece vehicle suspension component of claim 2, wherein the second resilient component includes a peripheral edge extending over the first rigid component.

4. The multi piece vehicle suspension component of claim 1, wherein the second resilient component includes a plurality of indentations.

5. The multi piece vehicle suspension component of claim 4, wherein each indentation of the plurality of indentations has a generally rectangular cross section.

6. The multi piece vehicle suspension component of claim 1, wherein the bonding agent is an adhesive layer.

7. The multi piece vehicle suspension component of claim 6, wherein the adhesive layer is an urethane electrocoating.

8. The multi piece vehicle suspension component of claim 1, wherein the second resilient component is micro cellular urethane.

9. The multi piece vehicle suspension component of claim 1, wherein the first rigid component is metal.

10. The multi piece vehicle suspension component of claim 1, wherein the first rigid component includes an upper surface.

11. The multi piece vehicle suspension component of claim 10, wherein the second component includes a lower surface.

12. The multi piece vehicle suspension component of claim 11, wherein the bonding agent connects the upper surface of the first rigid component to the lower surface of the second resilient component.

13. The multi piece vehicle suspension component of claim 1, wherein the second resilient component is a bump stop.

14. The multi piece vehicle suspension component of claim 1, wherein the second resilient component is a strut mount.

15. The multi piece vehicle suspension component of claim 1, wherein the second resilient component is a bushing.

16. The multi piece vehicle suspension component of claim 1, wherein the second resilient component is a formed layer of micro cellular urethane having corresponding structural features as the first rigid component.

17. The multi piece vehicle suspension component of claim 16, wherein the formed layer includes an upper surface.

18. The multi piece vehicle suspension component of claim 17, wherein the upper surface of the formed layer includes a plurality of indentations.

19. A multi piece vehicle suspension component, the suspension component comprising:
a first metal component including an upper surface;
a second resilient component including a lower surface, the second resilient component being formed of a microcellular urethane, the microcellular urethane having NCO groups, the first component having complementary structure with respect to the second component, the upper surface of the first component connected to and overlaying a portion of the lower surface of the second component; and
an adhesive layer disposed between the upper surface of the first component and the lower surface of the second component to prevent corrosion of the first rigid component, the adhesive layer being an urethane electrocoating, the second resilient component molded on the adhesive layer of the first rigid component, the NCO groups in the microcellular urethane having an affinity for the active molecules in the adhesive layer and cross-linking to form a durable bonded layer thereby improving bonding between the first rigid component and the second resilient component and further improving cyclic fatigue of the multi piece vehicle suspension component.

20. The multi piece vehicle suspension component of claim 19, wherein the first rigid component and second resilient component are generally circular, each including a first aperture.

21. The multi piece vehicle suspension component of claim 20, wherein the second resilient component includes a peripheral edge extending over the first rigid component.

22. The multi piece vehicle suspension component of claim 19, wherein the second resilient component includes a plurality of indentations.

23. The multi piece vehicle suspension component of claim 22, wherein each indentation of the plurality of indentations has a generally rectangular cross section.

24. The multi piece vehicle suspension component of claim 19, wherein the adhesive layer is an urethane electro coating.

25. The multi piece vehicle suspension component of claim 19, wherein the second resilient component is micro cellular urethane.

26. The multi piece vehicle suspension component of claim 19, wherein the second resilient component is a bump stop.

27. The multi piece vehicle suspension component of claim 19, wherein the second resilient component is a strut mount.

28. The multi piece vehicle suspension component of claim 19, wherein the second resilient component is a bushing.

29. The multi piece vehicle suspension component of claim 19, wherein the second resilient component is a formed layer of micro cellular urethane having corresponding structural features as the first rigid component.

30. The multi piece vehicle suspension component of claim 29, wherein the formed layer includes an upper surface.

31. The multi piece vehicle suspension component of claim 30, wherein the upper surface of the formed layer includes a plurality of indentations.

32. A method for bonding a vehicle suspension subassembly, the method comprising the steps of:
applying a bonding agent to a first rigid component, the bonding agent being an urethane electrocoating;
molding a second resilient component on the bonding agent of the first rigid component, the second resilient component being formed of a microcellular urethane, the microcellular urethane having NCO groups;
molding the second resilient component on the first rigid component; and
curing the bonding agent between the first rigid component and the second resilient component to form the vehicle suspension subassembly, the NCO groups in the microcellular urethane having an affinity for the active molecules in the bonding agent and cross-linking to form a durable bonded layer thereby improving bonding between the first rigid component and the second resilient component and further improving cyclic fatigue of the vehicle suspension subassembly.

33. The method for bonding a vehicle suspension subassembly of claim 32, wherein the bonding agent is an adhesive.

34. The method for bonding a vehicle suspension subassembly of claim 33, wherein the adhesive is an urethane electrocoating.

35. The method for bonding a vehicle suspension subassembly of claim 32, wherein the first rigid component is a metal suspension component.

36. The method for bonding a vehicle suspension subassembly of claim 32, wherein the second resilient component is a micro cellular urethane suspension component.

37. The method for bonding a vehicle suspension subassembly of claim 32, wherein the bonding agent is applied to a first surface of the first component.

38. The method for bonding a vehicle suspension subassembly of claim 37, wherein the first surface of the first component is an upper surface.

* * * * *